No. 789,701. PATENTED MAY 9, 1905.
E. W. PEARCE.
PASTE JAR.
APPLICATION FILED FEB. 10, 1905.
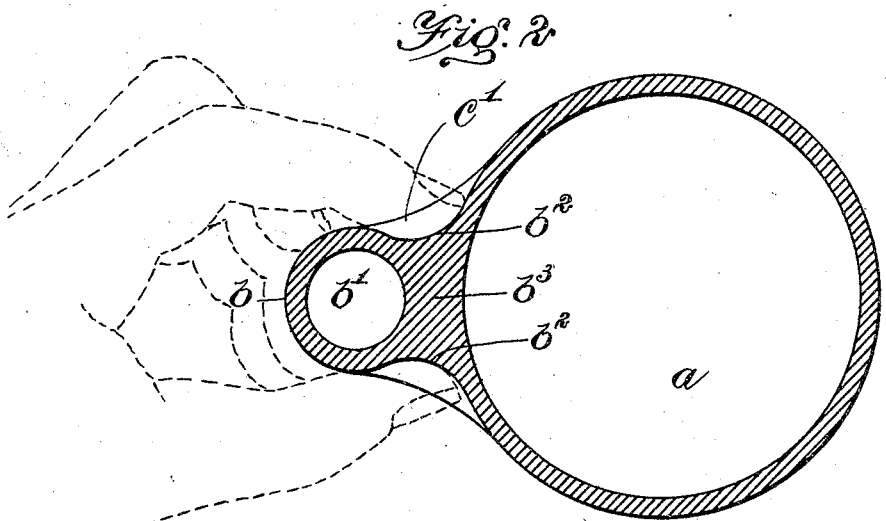
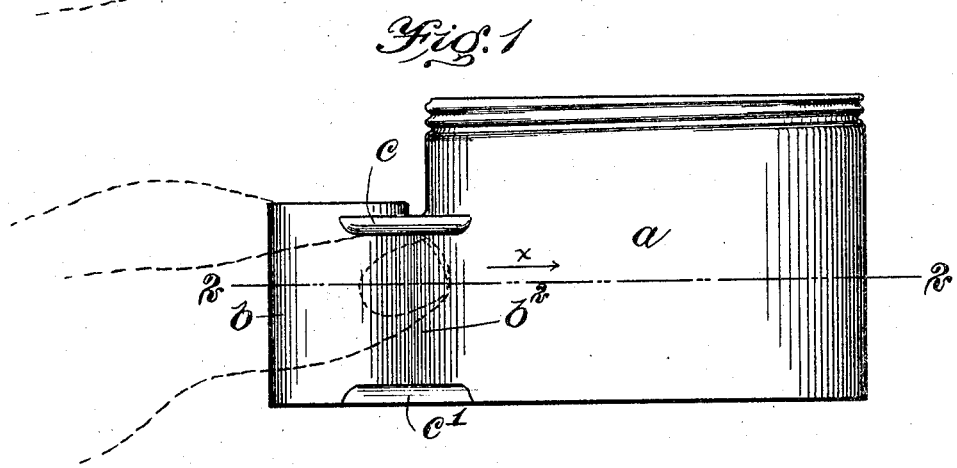
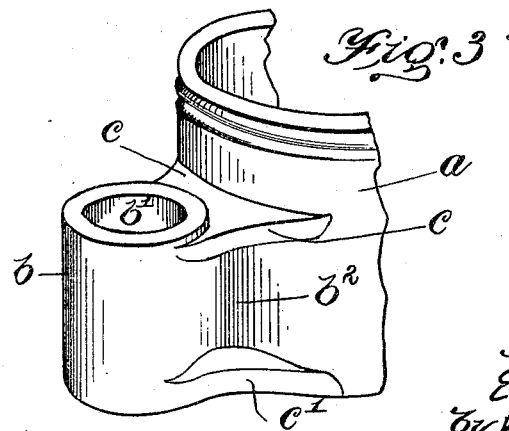

No. 789,701.

Patented May 9, 1905.

UNITED STATES PATENT OFFICE.

ELWOOD W. PEARCE, OF MILTON, MASSACHUSETTS, ASSIGNOR TO RUSSIA CEMENT COMPANY, OF GLOUCESTER, MASSACHUSETTS, A CORPORATION OF MASSACHUSETTS.

PASTE-JAR.

SPECIFICATION forming part of Letters Patent No. 789,701, dated May 9, 1905.

Application filed February 10, 1905. Serial No. 245,028.

*To all whom it may concern:*

Be it known that I, ELWOOD W. PEARCE, of Milton, in the county of Norfolk and State of Massachusetts, have invented certain new and useful Improvements in Paste-Jars, of which the following is a specification.

This invention relates to jars for containing an adhesive—such as paste, mucilage, &c.—which is ordinarily applied by a brush, and has for its object to provide a paste-jar having a handle of improved form adapted to be securely gripped between the thumb and finger without liability of slipping, the said handle serving also as a brush-receptacle.

The invention consists in the improvements which I will now proceed to describe and claim.

Of the accompanying drawings, forming a part of this specification, Figure 1 represents a side elevation of a paste-jar embodying my invention. Fig. 2 represents a section on line 2 2 of Fig. 1. Fig. 3 represents a perspective view of the handle portion of the jar.

The same reference characters indicate the same parts in all the figures.

In the drawings, $a$ represents the body portion of the paste-jar, the same being preferably of cylindrical form, and $b$ represents the handle portion, which is preferably integral with the body, the two being molded from glass or other like material. The handle is a hollow boss or projection containing a brush-receiving cavity $b'$ and having at its opposite sides concave seats or faces $b^2$, which form the sides of a neck portion $b^3$ between the cavities of the body and handle portions. The said faces $b^2$ are shaped, as indicated in Fig. 2, to form rests for a thumb and finger, between which the handle is grasped. The width of the neck portion between the rests $b^2$ is less than the diameter of the brush-receiving portion of the handle, so that the thumb and fingers are enabled to firmly grasp the handle and prevent it from slipping outwardly in the direction indicated by the arrow $x$ in Fig. 1. $c$ and $c'$ represent obliquely-extending webs formed at the upper and lower portions of the rests $b^2$, said webs constituting stops which engage the thumb and fingers and prevent the handle from slipping downwardly. The said webs also strengthen the handle and reduce liability of breakage of the same at the neck portion $b^3$.

It will be seen that the handle above described enables the jar to be conveniently grasped and securely held between the thumb and finger without liability of accidental displacement in any direction. The concave form of the rests $b^2$ $b^2$ enables the thumb and finger to have an extended bearing on the handle and to therefore prevent the handle from twisting or turning between the thumb and finger. This control is aided by the webs $c$ $c'$, which are adapted to bear on the upper portions of the thumb and finger.

I claim—

A paste-jar having a hollow handle formed on one side of the body of the receptacle, said handle constituting a brush-holder, and having recessed finger and thumb rests at its sides, and webs extending across said rests and forming stops to engage the thumb and finger.

In testimony whereof I have affixed my signature in presence of two witnesses.

ELWOOD W. PEARCE.

Witnesses:
  C. F. BROWN,
  E. BATCHELDER.